United States Patent [19]
Nimblett et al.

[11] Patent Number: 5,852,492
[45] Date of Patent: Dec. 22, 1998

[54] FUSED LASAR RANGE/INTENSITY IMAGE DISPLAY FOR A HUMAN INTERPRETATION OF LASAR DATA

[75] Inventors: Donald W. Nimblett, Cedar Hill; Bruno J. Evans; Gary K. Jenkins, both of Arlington, all of Tex.

[73] Assignee: Lockheed Martin Vought Systems Corp., Houston, Tex.

[21] Appl. No.: 660,443

[22] Filed: Jun. 7, 1996

[51] Int. Cl.$^6$ .............................. G01C 3/08; G01S 13/00
[52] U.S. Cl. ........................ 356/5.04; 342/181; 342/179
[58] Field of Search ................ 356/5.04; 342/181, 342/179

[56] References Cited

U.S. PATENT DOCUMENTS

| | | | |
|---|---|---|---|
| 3,893,110 | 7/1975 | Drake | 343/5 |
| 4,081,802 | 3/1978 | Elmore et al. | 343/5 |
| 4,596,145 | 6/1986 | Smith et al. | 73/626 |
| 4,686,659 | 8/1987 | Yamamoto | 367/87 |
| 4,694,434 | 9/1987 | von Ramm et al. | 367/7 |
| 5,198,819 | 3/1993 | Susnjara | 342/26 |
| 5,252,950 | 10/1993 | Saunders et al. | 345/9 |

FOREIGN PATENT DOCUMENTS

| | | |
|---|---|---|
| 2286496 | of 0000 | United Kingdom . |
| WO 96/3611 | of 0000 | WIPO . |

OTHER PUBLICATIONS

British Patent Office Search Report Under Section 17(5) for GB 9711833.5 dated Sep. 5, 1997.

*Primary Examiner*—Mark Hellner
*Attorney, Agent, or Firm*—Arnold, White & Durkee

[57] ABSTRACT

A method and apparatus for generating a range image and an intensity image of a target field is disclosed. The range image and the intensity image are fused into a single image that contains range and intensity information. In one embodiment, only a single range band is illuminated with colors in the fused image. This range band can be scrolled throughout the fused image to detect three dimensional features more clearly.

11 Claims, 19 Drawing Sheets

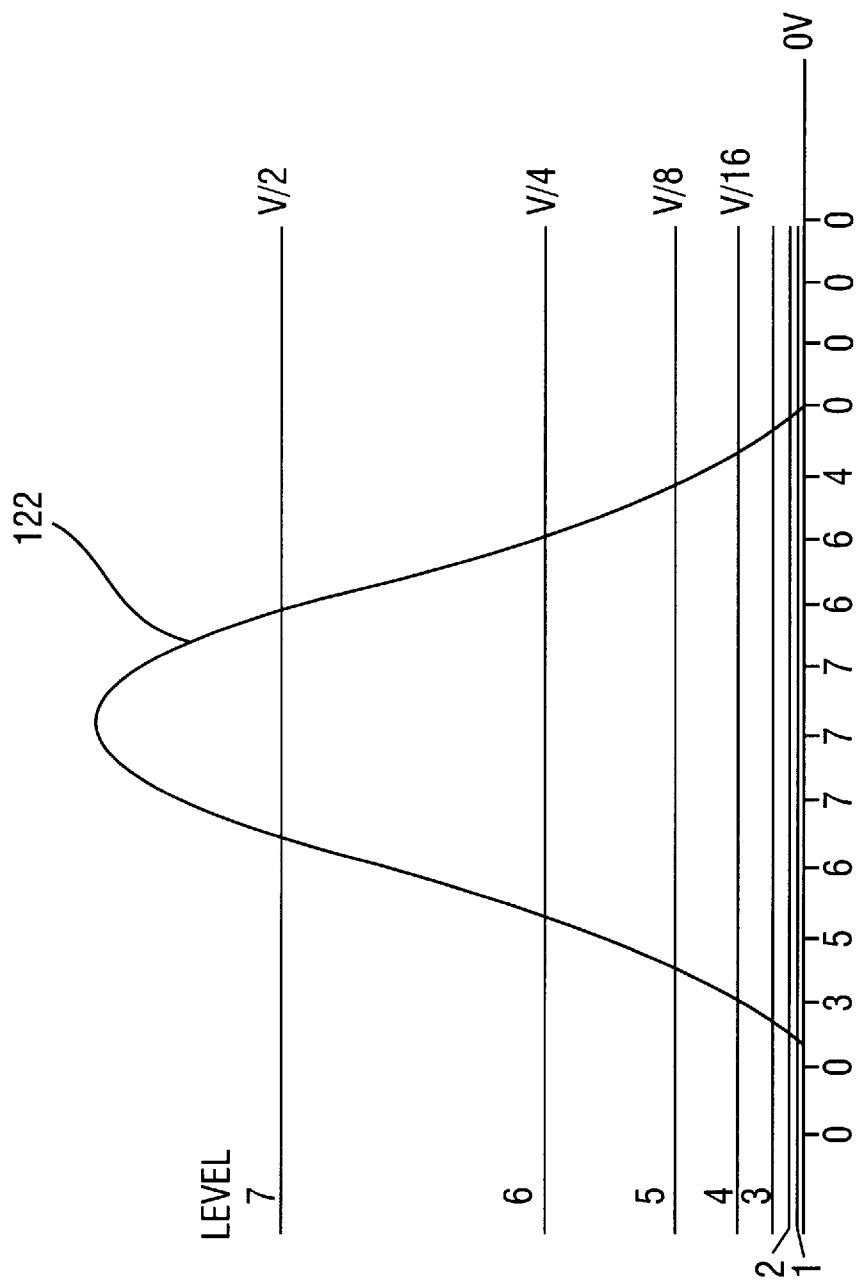

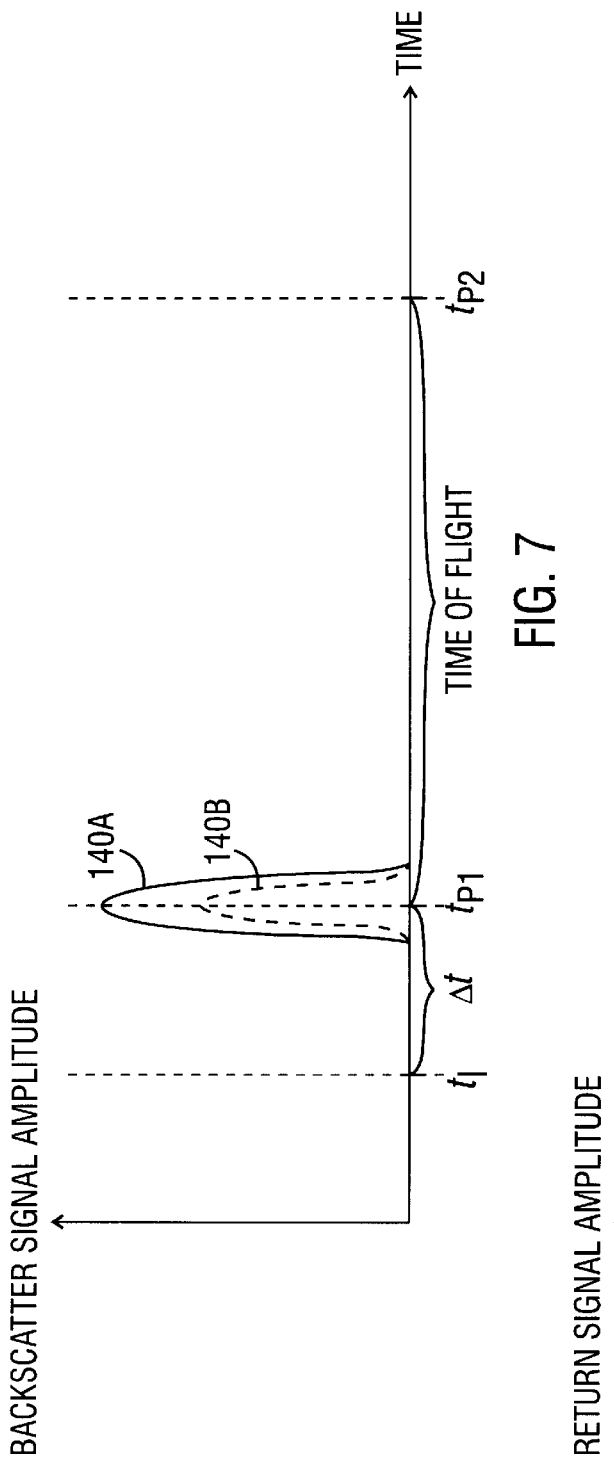
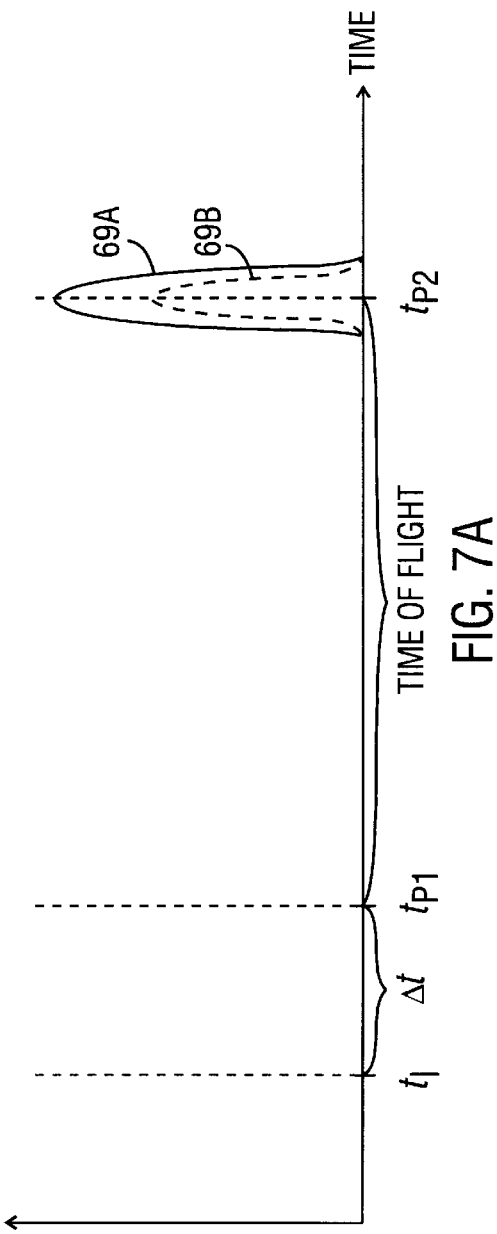

FUSED LASAR RANGE/INTENSITY IMAGE DISPLAY FOR A HUMAN INTERPRETATION OF LASAR DATA

BACKGROUND OF THE INVENTION

1. Field of the Invention

This invention relates generally to laser detection and ranging (LADAR) systems and, more particularly, to methods and apparatus for improving LADAR imaging.

2. Description of the Related Art

Methods and apparatus for identifying targets, whether such targets have been stationary or moving, have existed for many years. For instance, in World War II, the British developed and utilized radar for identifying the incoming planes of the German Luftwaffe. Radar uses radio waves (instead of the light waves that human eye uses to see) to locate objects at great distances even in bad weather or in total darkness. Currently, radar is employed in a wide variety of areas, including air traffic control, early warning systems for national defense, law enforcement of speed limits on highways, and weather forecasting, along with the more traditional use of radars for target identification. While ground-based and airborne radar are used to identify enemy ships and aircraft, radar is also used to aim and fire guns and missiles. In addition, radar has also been used to map terrain.

While radar has proven quite effective in many areas, radar is inherently limited because of its use of radio frequency signals and the size of the resultant antennas used to transmit and receive such signals. In an effort to overcome some of these limitations, lasers have been employed in detection and ranging systems. Like radar, which takes its name from the phrase "radio detection and ranging," laser detection and ranging systems are referred to as LADAR systems. Like radar systems, which transmit radio waves and receive waves reflected from objects, often called targets, LADAR systems transmit laser beams and receive reflections from targets. Because of the short wavelengths associated with laser beam transmissions, LADAR imaging exhibits much greater resolution than radar imaging. In other words, LADAR is capable of more accurately pinpointing a target than radar.

The LADAR systems designed by the assignee of the present invention form two different types of images. However, before describing these images, it should be understood how these images are formed. A scan pattern is generated by scanning a pulsed laser beam in a pattern throughout a particular field. The generation of this scan pattern is somewhat similar to the manner in which an electron gun in a television set is rastered many times a second over the entire screen to generate a television image. In fact, LADAR images are frames of pixels having x rows and y columns to form a pixel array. While such an array may be any of a variety of sizes, a common array size is 256 pixels per row and 256 pixels per column.

One of the images generated in this manner is referred to as the "range" image. The range image is generated by determining the time between the departure of a laser pulse and the corresponding return laser pulse that has been reflected from an object in the pattern field. For display purposes, each range image is divided into range bands. A repeating color spectrum is assigned to each range band in the range image so that relative distances of objects in the range image can be perceived. For example, objects in a particular range image may be from 1,000 to 2,000 meters away from the LADAR, and the color bands may each be 100 meters. In this example, the range image would show ten repeating color bands. Each color band might use, for instance, five different colors to illustrate the relative range of an object within the color band. Blue might be used to represent the range of each object in the first 20 meters of a color band, with the colors green, yellow, red, and purple used to represent the range of objects in successive 20 meter bands of each color band.

The other type of image generated by a LADAR system is referred to as an "intensity" image. The intensity image is generated by determining the magnitude of each reflected laser pulse received by the LADAR system. Highly reflective objects in the field, such as light colored objects, appear lighter in the intensity image because the laser pulse reflected from these materials will have a relatively high magnitude. Poorly reflective materials, such as dark colored objects, appear darker in the intensity image because these materials absorb much of the transmitted laser pulse and, thus, the reflected pulse received by the LADAR system is relatively weak.

While the range and intensity images are images of the same field, they actually convey quite different information. As discussed briefly above, the range image is a colored image of the field. The colors convey information regarding the relative distance of each object in the field from the LADAR system. Although humans can interpret a color range image, such interpretation typically requires modicum of experience. The difficulty of human interpretation of range images generally arises from the fact that each image contains several colors and multiple color bands. These repeating color bands give the range image what is sometimes referred to as the "Navaho blanket" effect.

Unlike the range image, the intensity image depicts the field in shades of gray, much like a black and white picture. Some objects in the field are easier to detect in the intensity image than in the range image, but often the opposite is true. Of course, even if an object is easier to detect in the intensity image than in the range image, the intensity image does not convey any information as to the distance of the object from the LADAR system.

In addition to the range image and the intensity image, a LADAR system can also produce a height image. In other words, a LADAR system can compute the x, y, and z value for each pixel in the range image and display the scaled z values to approximate the height above ground of each object in the field. Like the range image, the height image is also attributed color bands. However, because the height of objects in the field is typically much less than the depth of objects in the field, fewer color bands are used.

The present invention is primarily directed to overcoming or reducing the effects of one or more of the problems mentioned above. However, the present invention may overcome other problems not mentioned herein.

SUMMARY OF THE INVENTION

In accordance with one aspect of the present invention, there is provided a LADAR system adapted to generate a range image and an intensity image, where the improvement includes means for combining the range image and the intensity image into a fused image.

In accordance with another aspect of the present invention, there is provided a method of generating target information. The method includes the steps of:

(a) generating a range image;

(b) generating an intensity image; and (c) combining the range image and the intensity image to generate a fused image.

In accordance with yet another aspect of the present invention, there is provided an apparatus for generating target information. The apparatus includes means for generating a range image and means for generating an intensity image. The apparatus further includes means for combining the range image and the intensity image to generate a fused image.

In accordance with still another aspect of the present invention, there is provided an apparatus for generating target information. The apparatus includes a transmitter that is adapted to deliver a signal into a target field. A receiver is adapted to receive a reflection of the signal from an object in the target field and to deliver a reflection signal correlative to the received reflection. A processor is coupled to the receiver to receive the reflection signal. The processor processes the reflection signal to generate a first image of the target field and a second image of the target field, and the processor combines the first image and the second image to form a fused image of the target field.

In accordance with a further aspect of the present invention, there is provided an apparatus for generating target information. The apparatus includes a transmitter that is adapted to deliver a signal into a target field. A receiver is adapted to receive a reflection of the signal from an object in the target field and to deliver a reflection signal correlative to the received reflection. A processor is coupled to the receiver to receive the reflection signal. The processor processes the reflection signal to generate a range image correlative to a distance from the transmitter to the object and an intensity image correlative to reflectivity of the object. The processor combines the range image and the intensity image to form a fused image of the target field containing range and intensity information.

In accordance with a still further aspect of the present invention, there is provided a LADAR system that includes an optical transmitter and receiver that are adapted to scan a laser pulse through a target field and to receive a reflection of the laser pulse from an object in the target field. A pulse capture device is coupled to the optical transmitter and receiver. The pulse capture device has an optical-to-electrical converter that converts the reflection to a correlative electrical signal. A signal processing unit receives the electrical signal and generates an image containing information correlative to a distance from the optical transmitter and receiver to the object and containing information correlative to reflectivity of the object.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The foregoing and other advantages of the invention will become apparent upon reading the following detailed description and upon reference to the drawings in which:

FIG. 6 illustrates an exemplary pulse signal being operated upon by the comparator circuit of FIG. 5;

FIG. 7 illustrates exemplary representations of transmitted laser pulses and exemplary return laser pulses;

Figure 1:
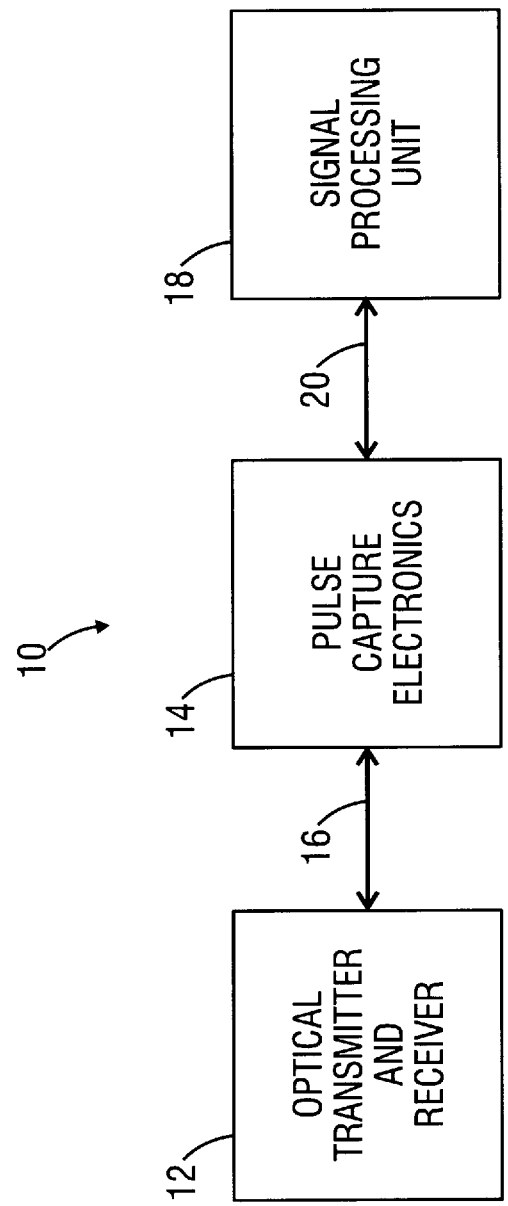
FIG. 1 illustrates a block diagram of a LADAR system in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF THE PREFERRED EMBODIMENTS

Turning now to the drawings and referring initially to FIG. 1, there is illustrated a block diagram of a LADAR system generally designated by the reference numeral 10. The LADAR system 10 includes an optical transmitter and receiver 12. As will be discussed more fully below, the optical transmitter and receiver 12 generates a laser beam and scans the laser beam in a predetermined field pattern. Objects in the scanned field reflect the scanned laser beam, and the optical transmitter and receiver 12 receives some of these reflections.

The optical transmitter and receiver 12 delivers signals indicative of these received reflections to pulse capture electronics (PCE) 14 via line 16. The PCE 14 essentially converts the received laser light reflections into correlative electronic signals. It then digitizes the electronic signals and creates signals indicative of range and signals indicative of intensity.

The PCE 14 delivers these range and intensity signals to a signal processing unit 18 via line 20. The signal processing unit 18 creates a range image and an intensity image using a plurality of these signals which represent the returned reflections of the laser beam being scanned over a particular field.

Figure 2:
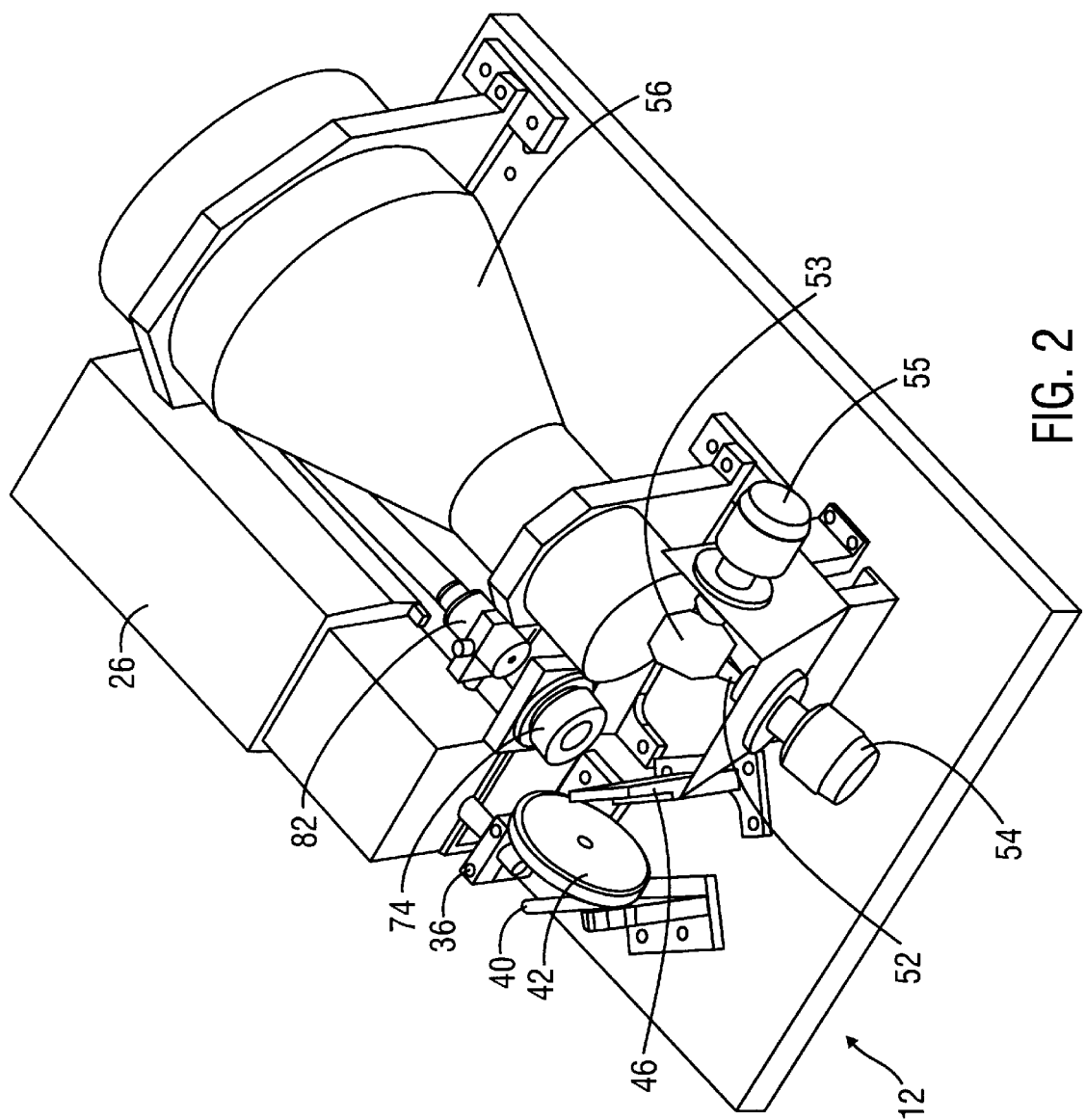
FIG. 2 illustrates a perspective view of an exemplary optical transmitter and receiver for use with a LADAR system.

Although a variety of LADAR systems may enjoy the benefits described and claimed herein, a specific LADAR system will be described for purposes of providing an example of a specific embodiment. One example of an optical transmitter and receiver 12 is illustrated in, and will be described in reference to, FIGS. 2 and 3. Depending upon its intended use, the optical transmitter and receiver 12 may be portable, mounted on a gimbal mechanism (not shown), or fixedly mounted. Basically, the optical transmitter and receiver 12 includes a laser unit 26, which emits laser beam pulses used for illuminating a target, and an optical system generally designated by the reference numeral 28, which transmits the laser beam pulses to the target and receives reflections from the target in the form of return pulses.

The laser unit 26 includes a laser 30. In this embodiment, the laser 30 has an average power output in the range of 1 to 10 watts and produces a laser beam pulse having a wavelength in the near infrared range of about 1.047 to 1.064 microns. The laser 30 may be, for instance, a neodymium-doped yttrium aluminum garnet, a neodymium-doped yttrium lithium fluoride, or a YVO4 laser capable of producing pulses with widths of 5 to 20 nanoseconds, energy per pulse in the range of 100 to 1000 microjoules, and repetition rates of 6 to 20 kHz.

Advantageously, the light emitted by the LADAR system 10 is "eye safe." In other words, viewing such laser light does not damage the human eye. Wavelengths between 0.4 and 1.4 microns, and particularly those wavelengths above 0.7 microns that cannot be seen by the human eye, can cause such damage because these wavelengths can be focused and thereby concentrated by the lens of the eye onto the retina. The threshold at which eye damage may occur is much higher for wavelengths above 1.4 microns than for wavelengths below 1.4 microns.

To alter the wavelength of light emitted from the laser unit 26 eye safe, the laser unit 26 includes an optical parametric oscillator (OPO) 32. The laser 30 pumps the OPO 32, and, thus, the output power of the laser 30 should be sufficient to actuate the OPO 32. The OPO 32 converts the pulse from the laser 30 into a laser beam pulse of a different wavelength. This wavelength is advantageously above 1.4 microns, such as 1.54 microns.

The laser unit 26 generates a laser beam pulse 34, as described above, and transmits the laser beam pulse 34 into a beam expander 36. The beam expander 36 uses a series of positive and negative lenses to expand the diameter of the laser beam pulse 34 to provide an expanded beam, suitably by an 10 to 1 ratio while decreasing the divergence of the laser beam pulse 34 by the same ratio.

The laser beam pulse 34, now expanded, passes through a shutter 38 that opens before each scan and closes after each scan. By using the shutter 38, the laser 30 may remain on between scans, as the shutter 38 controls the distribution of the laser beam to the remainder of the optical transmitter and receiver 12.

Figure 3:
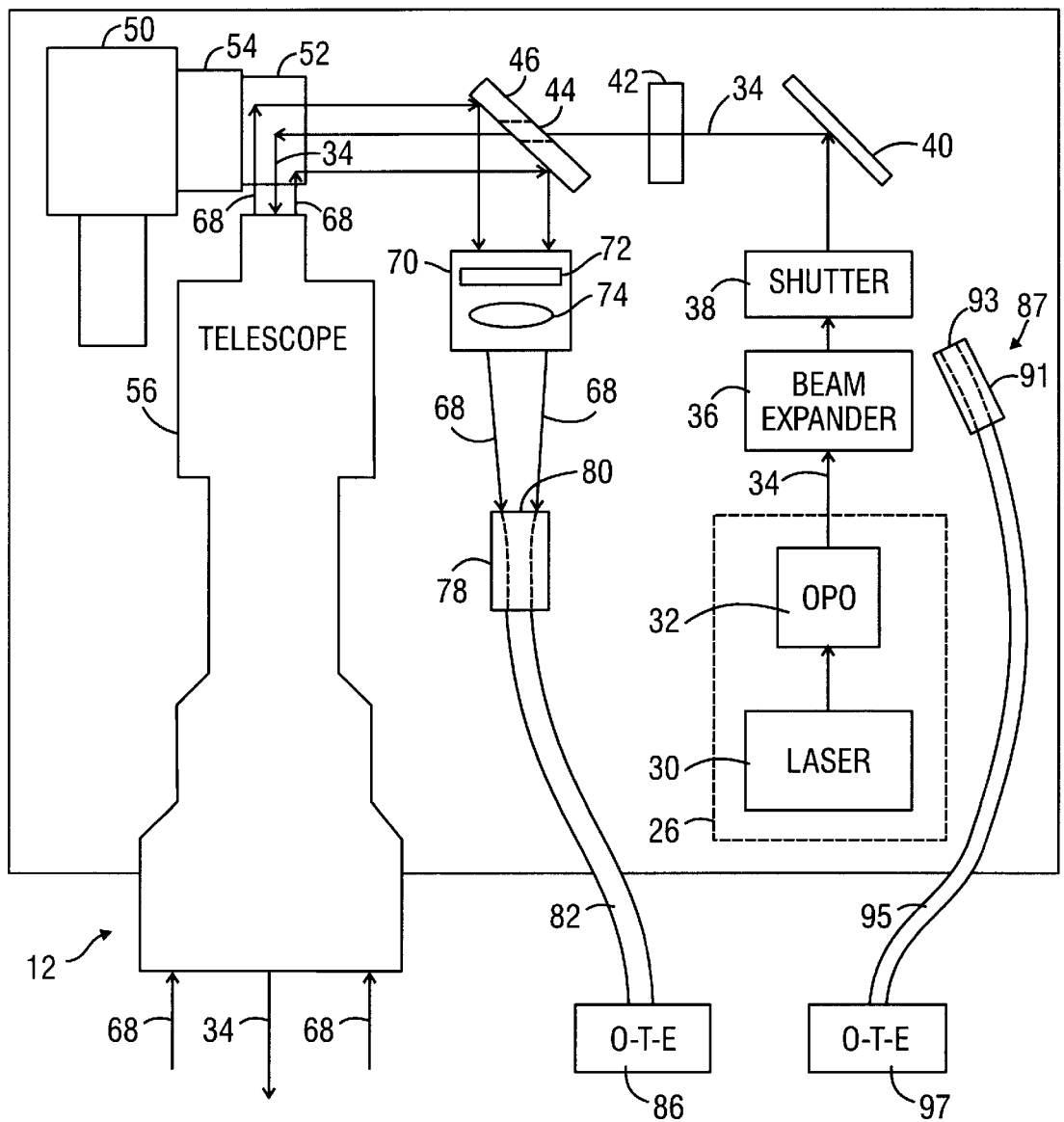
FIG. 3 illustrates a diagrammatic top view of the optical transmitter and receiver illustrated in FIG. 2.

After the laser beam pulse 34 passes through the open shutter 38, a folding mirror 40 reflects the laser beam pulse 34 through a filter 42. The filter 42 attenuates wavelengths other than the desired wavelength, e.g., 1.54 microns, produced by the laser unit 26. The laser beam pulse 34 next passes through a central aperture 44 in an apertured mirror 46 and is delivered to a scanning assembly 50. The scanning assembly 50 advantageously includes a scanning mirror 52 driven by a motor 54 and a scanning mirror 53 driven by a motor 55. (Only the scanning mirror 52 and the motor 54 are illustrated in FIG. 3 for purposes of clarity.) The scanning assembly 50 scans the laser beam pulse 34 in a given pattern to produce the desired image. The scanning mirror 53 directs the laser beam pulse 34 into a telescope 56. The telescope in this embodiment is a Galilean telescope, although other types of telescopes may be used.

When the transmitted laser beam pulse 34 delivered by the telescope 56 hits its target, the target reflects the laser beam pulse 34. Some of this reflected radiation bounces back toward the telescope 56 where it is received in the form of a return pulse generally designated by the reference numeral 68. The return pulse 68 impinges upon the scanning mirror 53 which, in combination with the scanning mirror 52, directs the return pulse 68 toward the apertured mirror 46. Because the return pulse 68 is of substantially larger cross-sectional area than the transmitted laser beam pulse 34, it strikes substantially the entire reflecting surface of the apertured mirror 46, and substantially all of its energy is thus reflected laterally by the apertured mirror 46 toward collection optics, generally designated by the reference numeral 70.

The collection optics 70 include a narrow band filter 72 that filters out wavelengths of light above and below a desired laser wavelength to reduce background interference from ambient light received by the collection optics 70 through the telescope 56. The return pulse 68 then passes through a condensing lens 74 that focuses the return pulse 68 toward a receiver 78. The receiver 78 holds the receiving end 80 of a light collection fiber optic 82 at the location where the return pulse 68 is focused.

The end of the fiber optic 82 opposite the receiving end 80 is connected to an optical-to-electrical converter 86. The optical-to-electrical converter 86 is advantageously a photodiode, such as an avalanche photodiode, which converts the reflected radiation 68 into an electrical signal 69 that the PCE 14 can process.

Positioned near the beam expander 36 is a backscatter detector, which is generally designated by the reference numeral 89. The backscatter detector 89 includes a receiver 91 that mounts the end 93 of a fiber optic 95 near the beam expander 36. The other end of the fiber optic 95 is coupled to an optical-to-electrical converter 97. Such optical-to-electrical converter 97 may be a photodiode, such as an avalanche photodiode.

The end 93 of the fiber optic 95 of the backscatter detector 89 receives scattered light, illustrated as a backscatter pulse 101, that is generated by the transmitted laser beam pulse 34 reflecting off of the optics in the optical transmitter and receiver 12. Thus, it should be understood that the backscatter detector 89 may be placed in any location where it can receive sufficient backscattered radiation. The fiber optic 95 delivers this light to the optical-to-electrical converter 97 that converts the light energy to a corresponding electrical backscatter signal.

This backscatter signal from the optical-to-electrical converter 97 is used for two purposes. First, the signal provides a timing reference that indicates when the laser beam pulse 34 was transmitted. As will be explained in greater detail below, the signal processing unit 18 uses this transmit timing reference to measure the time-of-flight of each return pulse 68 which is then used to generate the range image. Second, the signal has a magnitude that is correlative to the magnitude of the transmitted laser beam pulse 34. As will be explained in greater detail below, the signal processing unit 18 uses this magnitude signal to measure the time-varying magnitude of transmitted laser beam pulses 34. This measurement is used to adjust the magnitude of return pulses 68. These adjusted return pulses 68 are used to form the intensity image. This correction provides a sharper intensity image than do conventional methods.

Figure 4:
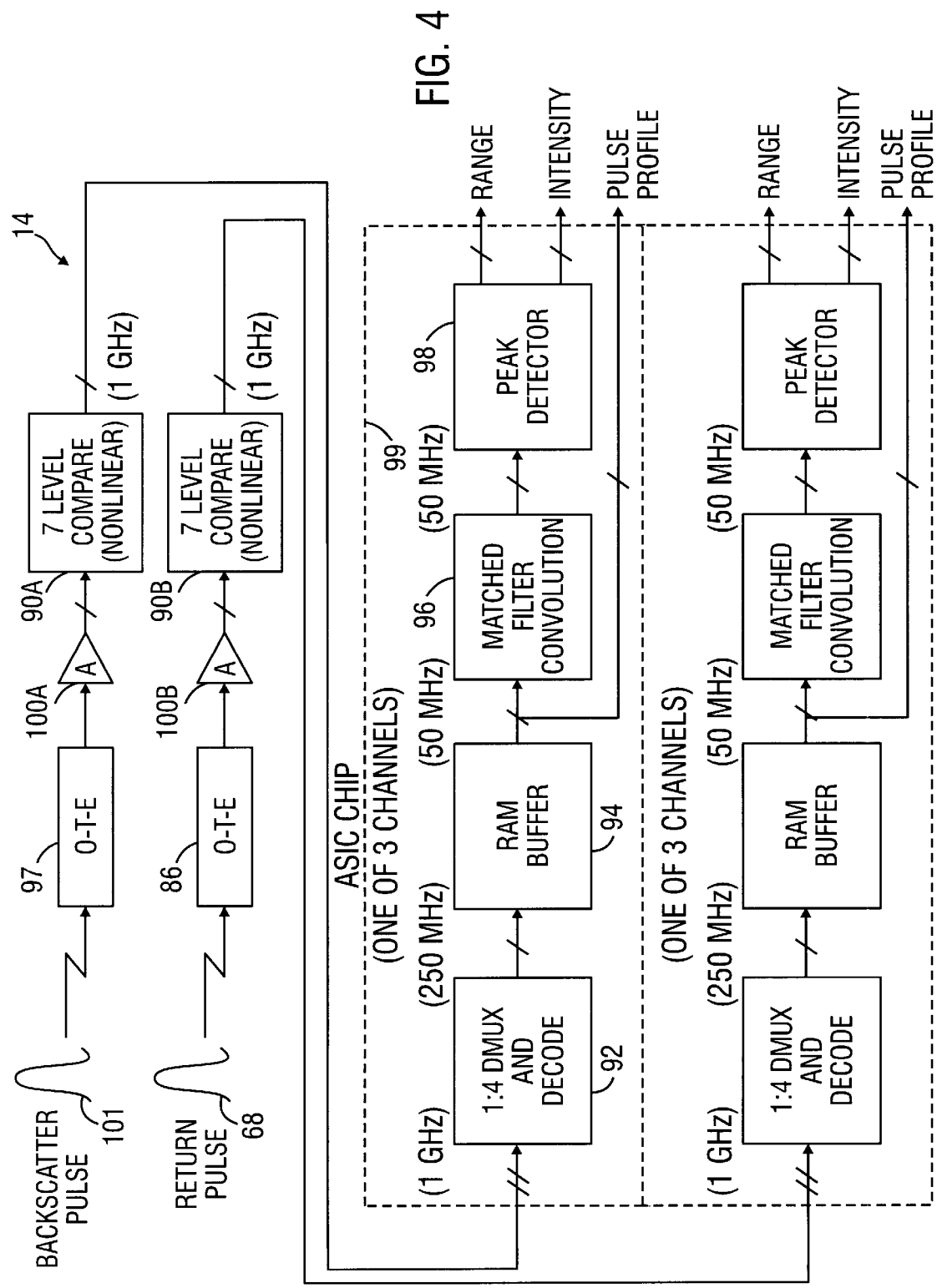
FIG. 4 illustrates a block diagram of exemplary pulse capture electronics for use with a LADAR system.

The optical-to-electrical converters 86 and 97 are actually part of the PCE 14 that is illustrated in detail in FIG. 4. The PCE 14 initiates the firing of the laser 26 and determines the time-of-flight, i.e., range, and intensity of the return pulses 68 received by the optical system 28. Each optical-to-electrical converter 86 and 97 is part of a separate channel used for processing that particular signal. Thus, in the example presented above, the PCE 14 has at least two channels that receive information from the optical transmitter and receiver 12. The PCE 14 includes five primary signal processing stages: (1) an analog-to-digital comparator circuit 90, (2) an encode and time-multiplex circuit 92, (3) a random access memory (RAM) buffer 94, (4) a matched-filter convolution circuit 96, and (5) a peak detector 98. In the disclosed embodiment, these stages are embodied as a three-channeled, monolithic, digital integrated circuit, commonly called an application specific integrated circuit (ASIC) 99, with an external analog comparator front end.

Each optical-to-electrical converter 86 and 97 feeds its electrically converted pulse to a separate comparator circuit 90a and 90b through a respective amplifier 100a and 100b. In this embodiment, the comparator circuits 90a and 90b are nonlinear. Specifically, the comparator circuits 90a and 90b each include seven individual comparators that have thresholds that logarithmically digitize the electrically converted backscatter pulse 101 and return pulse 68, respectively. The conversion to a logarithmic scale simplifies processing.

Figure 5:
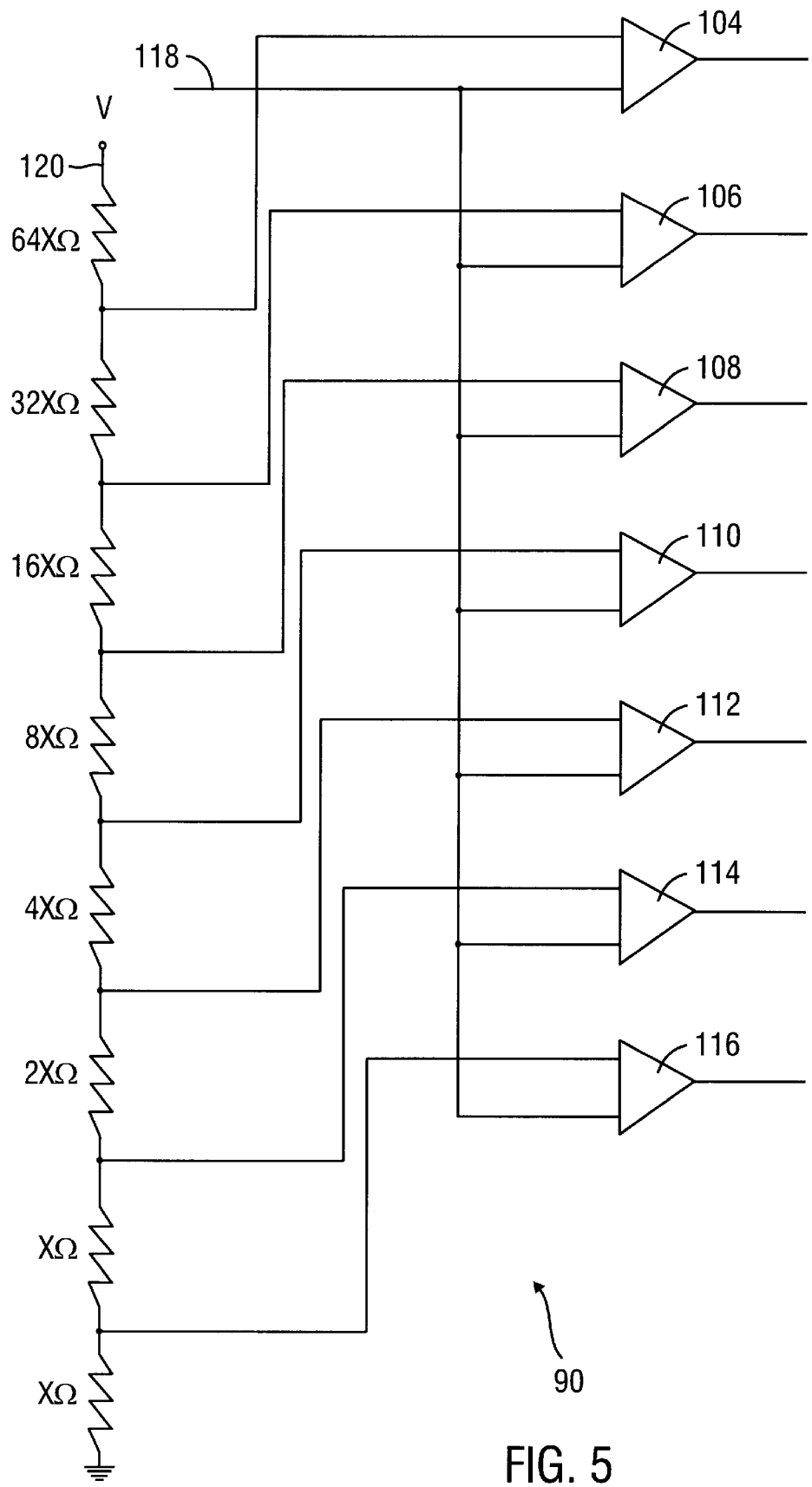
FIG. 5 illustrates a schematic diagram of an exemplary non-linear comparator circuit.

One example of the nonlinear comparator circuits 90a and 90b is illustrated in FIG. 5. The seven comparators 104, 106, 108, 110, 112, 114, and 116 each receive the input signal from the amplifier 100 on line 118. Each comparator 104–116 is coupled to a particular node on a resistor bridge 120. A voltage V is applied to the top of the resistor bridge 120. The values of the resistors in the resistor bridge 120 are selected so that the comparators 104–116 operate in logarithmic fashion. In other words, the threshold voltage for the comparator 116 is V/128 volts, the threshold voltage for the comparator 114 is V/64 volts, the threshold voltage for the comparator 112 is V/32 volts, the threshold voltage for the comparator 110 is V/16 volts, the threshold voltage for the comparator 108 is V/8 volts, the threshold voltage for the comparator 106 is V/4 volts, and the threshold voltage for the comparator 104 is V/2 volts.

The operation of the nonlinear comparator circuits 90a and 90b is quite simple. If the input voltage on line 118 is less than V/128 volts, each comparator 104–116 delivers a binary zero. Once the input voltage on line 118 rises slightly above V/128 volts, the comparator 116 outputs a binary one, while all other comparators 104–114 output binary zeros. As the input voltage on line 118 rises above each comparator's threshold voltage, that comparator delivers a binary one. Therefore, if the input voltage on line 118 rises above V/2 volts, all comparators 104–116 will output a binary one.

A graphical representation of this function may be found in FIG. 6, which plots the amplitude of an electrical input pulse 122 (which may represent the pulse delivered by either optical-to-electrical converter 97 or 86) versus time. As can be seen, the amplitude of the input pulse 122 begins at zero, rises above V/2 volts, and then falls back to zero. The numerals listed along the time axis depict the number of comparators 104–116 that output a binary one at a particular sampling time.

The encode and time multiplexing circuit 92, the RAM 94, the convolution circuit 96, and the peak detector 98 mentioned above form a channel and are part of the ASIC 99 illustrated in FIG. 4. As previously mentioned, the ASIC 99 in this embodiment has three such channels. However, for the purposes of this discussion, FIG. 4 illustrates only the two channels that are coupled to receive the backscatter pulse 101 and the return pulse 68. In the interest of clarity, only one channel will be described with the understanding that the other channels operate similarly.

The encode and time multiplexing circuit 92 samples the status or state of the comparator circuit 90 every nanosecond to determine how many comparators 104–116 are turned on, i.e., delivering a binary one. Advantageously, the encode and time multiplexing circuit 92 digitizes the received signal at a 1 GHz rate to yield a ranging resolution of 15 cm. By using the digital analysis techniques described above, a more robust determination of range can be obtained under dynamic conditions than would be the case with simpler analog methods used by some laser range finders.

The encode and time multiplexing circuit 92 has three functions: (1) to sample the input waveform at 1 GHz, (2) to encode the sampled code from the comparators 104–116 into a three-bit word logrithmically proportional to the peak of the input signal, and (3) to time demultiplex the signal to 250 MHz compatible with the RAM 94. For this last function, the circuit 92 includes a four-to-one time demultiplexer that allows 4 nanoseconds for the encoding of a signal. The encode and time multiplexing circuit 92 converts the seven bit input into three-bit samples that are stored in the RAM 94. This technique simplifies the PCE 14 and thus reduces the component cost. The RAM 94 stores the one nanosecond samples during the range-gated receive. Dead time between transmitted pulses is used to read and analyze the stored samples at a 50 MHz rate to simplify processing.

After the incoming data stream is digitized and stored, as described above, the detailed analysis that utilizes many time samples is performed. This analysis essentially slides a template across the stored sequence of samples to find the best match. The location of this best match corresponds to the arrival time of the return pulse 68, while the strength of the match is related to its intensity. The template averages or convolves many samples together to improve the signal-to-noise ratio and to find the center of the return pulse. A matched-filter convolution circuit 96 extracts the range and intensity information from the data stream that contains the return pulse 68. This process produces accurate data under low signal-to-noise conditions and with widely varying reflectivity returns, and it can isolate secondary returns from interference such as from under trees or behind camouflage nets. The PCE 14 delivers signals indicative of range, intensity, and pulse profile to the signal processing unit 18.

The PCE 14 also includes a firing circuit (not shown) that delivers a signal to the laser unit 26. The firing circuit delivers a fire signal at a user selectable rate, typically 6 to 10 kHz. The fire signal initiates the generation of the transmitted laser beam pulse 34. As can be seen by referring to the graph illustrated in FIG. 7, the fire signal occurs at time $t_i$. However, the laser beam pulse 34, represented by the backscatter signal 140 (the electrical equivalent of the backscatter pulse 101 delivered by the backscatter detector 89), is not delivered at time $t_i$ because it takes a finite amount of time, given the physics of the laser unit 26, to generate the laser beam pulse 34. Therefore, the laser beam pulse 34 does not fire until $t_{p1}$ which is some time $\Delta t$ after the arrival of the initial fire signal at time $t_i$. At time $t_{p1}$, the laser beam pulse 34, and thus the backscatter signal 140, reaches its peak amplitude and begins to diminish.

The backscatter signal 140 delivered by the backscatter detector 89 is used for two purposes. First, it denotes the time $t_{p1}$, which is the actual firing time, so that the signal processing unit 18 can determine the time-of-flight by subtracting $t_{p1}$ from $t_{p2}$. Second, the PCE 14 encodes the backscatter signal 140, determines its intensity, and delivers a signal correlative to its intensity to the signal processing unit 18. The signal processing unit 18 uses this information, along with similar information from other backscatter pulses to correct for differences in magnitude between the transmitted laser beam pulses 34. This can best be understood by referring to the following defined variables and the following mathematical equations that define the steps performed by the signal processing unit 18 as described with reference to FIGS. 8, 9A, and 9B:

K—scan variable equal to between 1 and L, where L is the number of scans to average I—row variable equal to between 1 and N, where N is the number of rows in the scan J—column variable equal to between 1 and M, where M is the number of columns in the scan $B_{I,J}$—backscatter intensity for pixel I,J (proportional to outgoing peak power)

$S_{I,J}$—signal intensity for pixel I,J (proportional to received peak power)

$C_{I,J}$—intensity correction factor for pixel I,J $S'_{I,J}$—corrected signal intensity for pixel I,J $SDC_{I,J}$—scanner dependent correction factor for pixel I,J $SUM_{I,J}$—the sum of L backscatter intensities $B_{I,J}$ $$B_{AVG} = \frac{\sum_{I=1\text{to}N, J=1\text{to}M} B_{IJ}}{N*M}$$

or $$B_{AVG} = B_{MEDIAN}$$

$$C_{IJ} = \frac{B_{IJ}}{B_{AVG}} \text{ for } I = 1 \text{ to } N \text{ and } J = 1 \text{ to } M$$

$$S'_{IJ} = \frac{S_{IJ}}{C_{IJ}} \text{ for } I = 1 \text{ to } N \text{ and } J = 1 \text{ to } M$$

Figure 8:
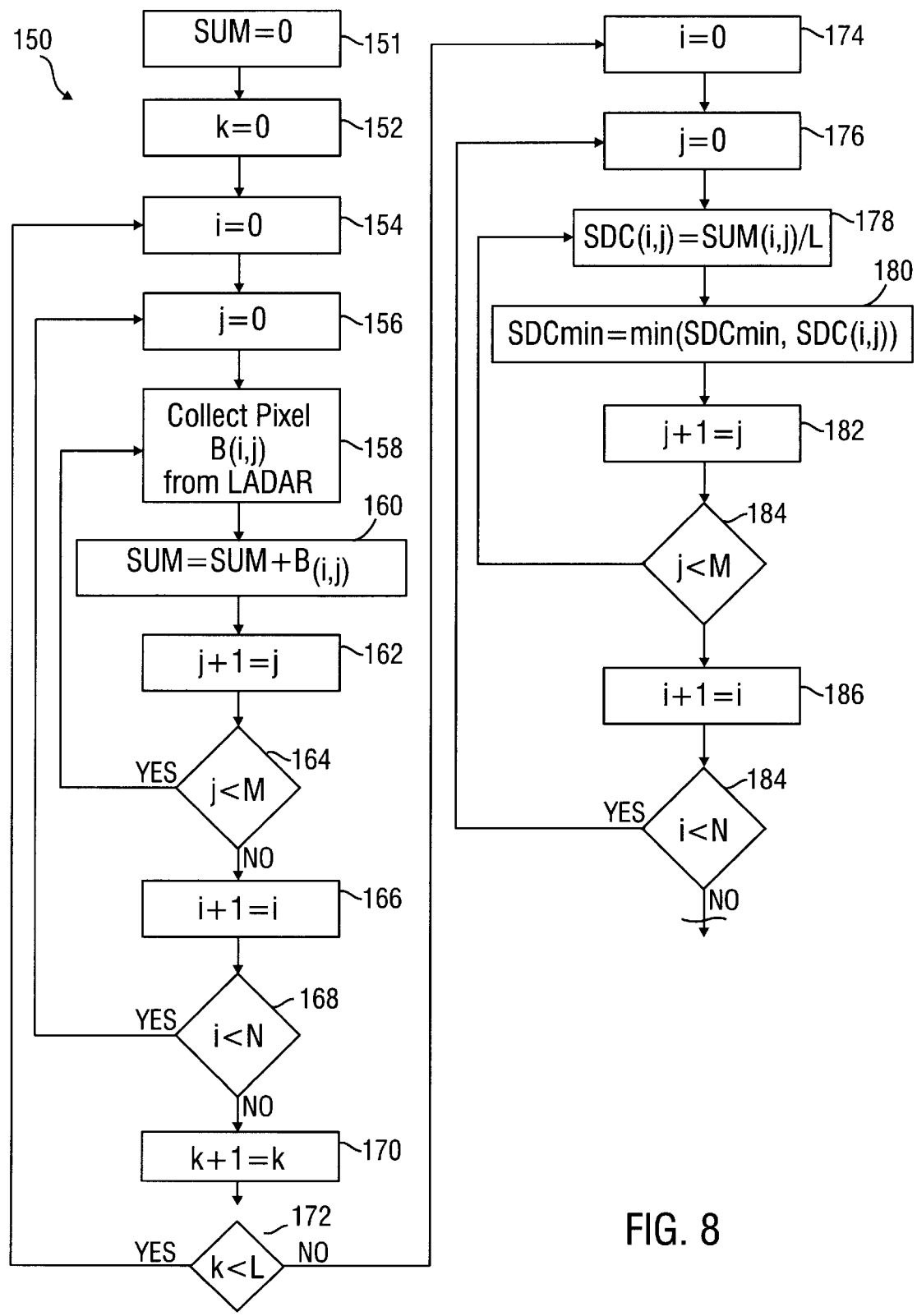
FIG. 8 illustrates a flowchart depicting the determination of a scanner dependent correction factor.
Figure 9A:
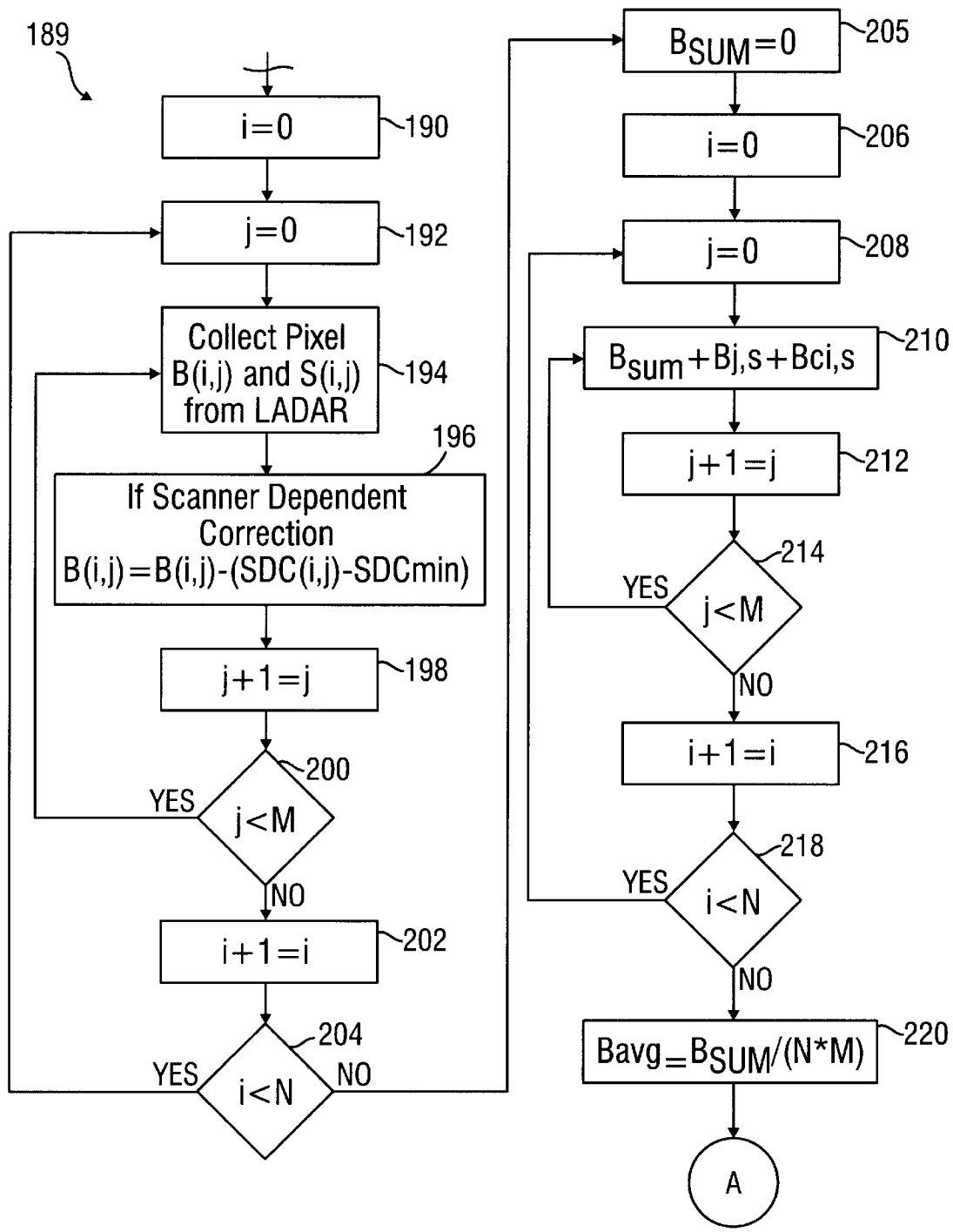
FIGS. 9A and 9B illustrate a flowchart depicting the formation of a corrected intensity image.
Figure 9B:
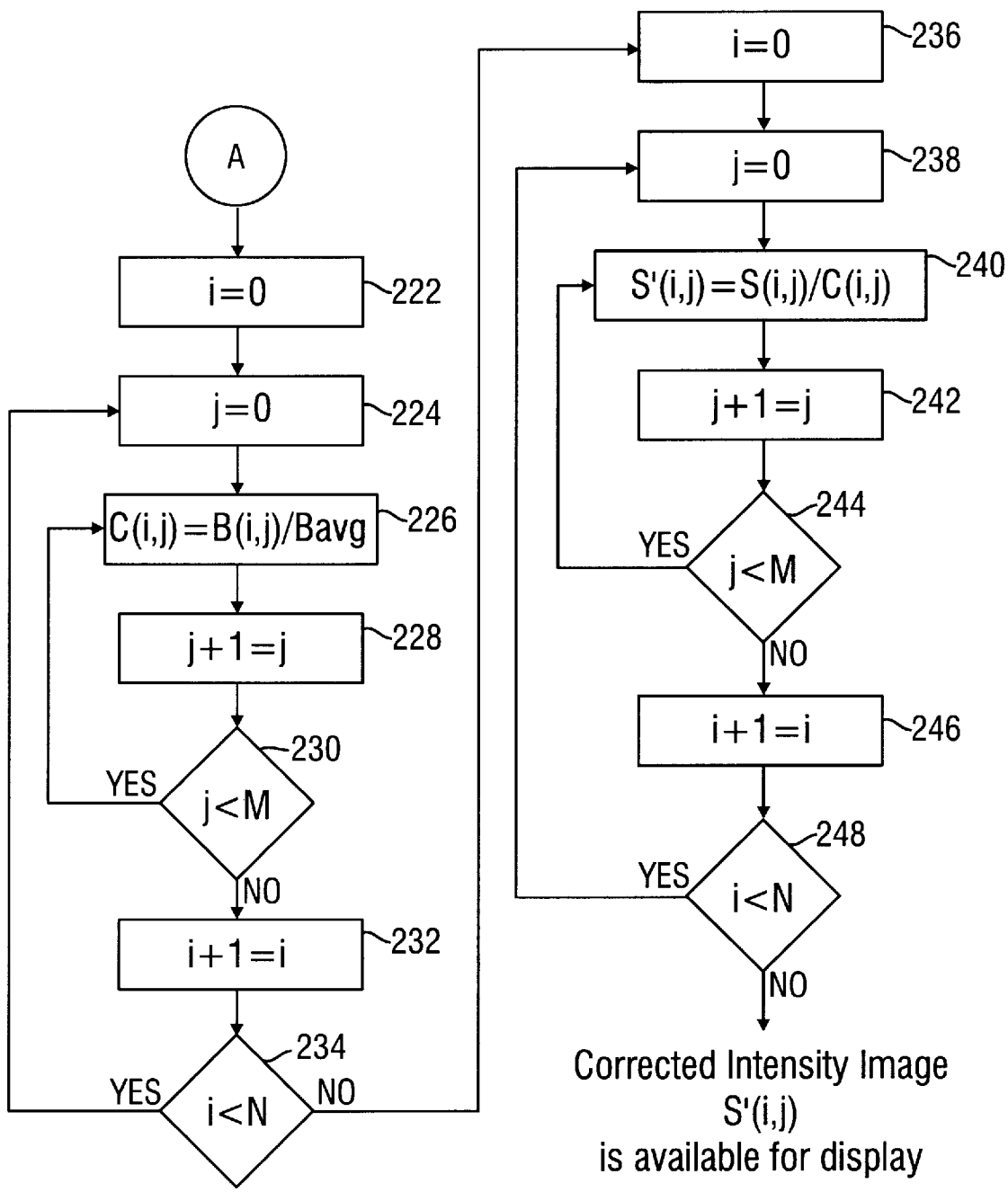

FIGS. 8, 9A, and 9B illustrate flowcharts 150 and 189 that describe the manner in which the signal processing unit 18 processes the intensity signals to form a sharper intensity image. To form a sharper and more accurate intensity image, the signal processing unit 18 performs two basic functions. First, the signal processing unit 18 corrects for scanner-induced anomalies. Second, the signal processing unit 18 corrects for intensity variations caused by differences in magnitude of the many transmitted laser beam pulses 34 that produce the return pulses 68 used to create an entire image.

Figure 10A:
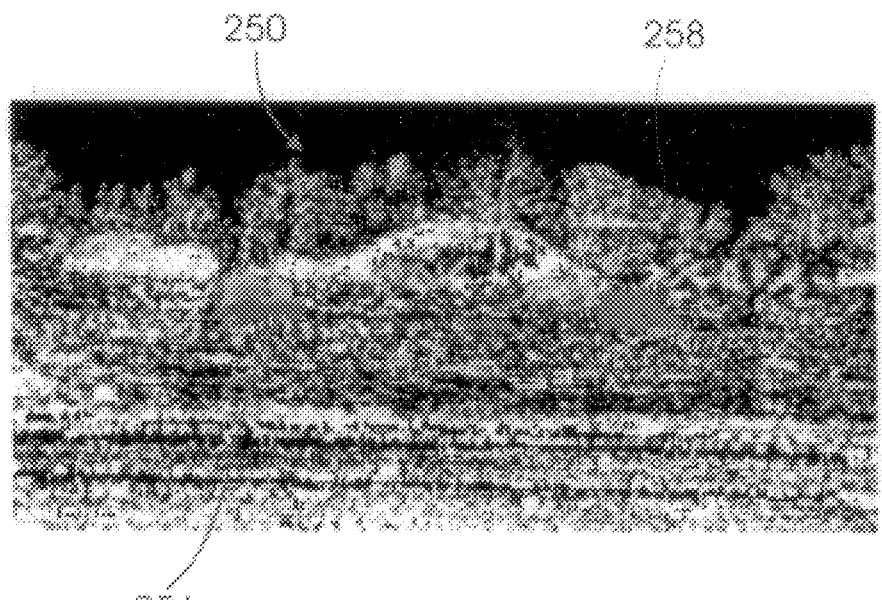
FIG. 10A illustrates an exemplary fused range and intensity image of a first field.
Figure 10B:
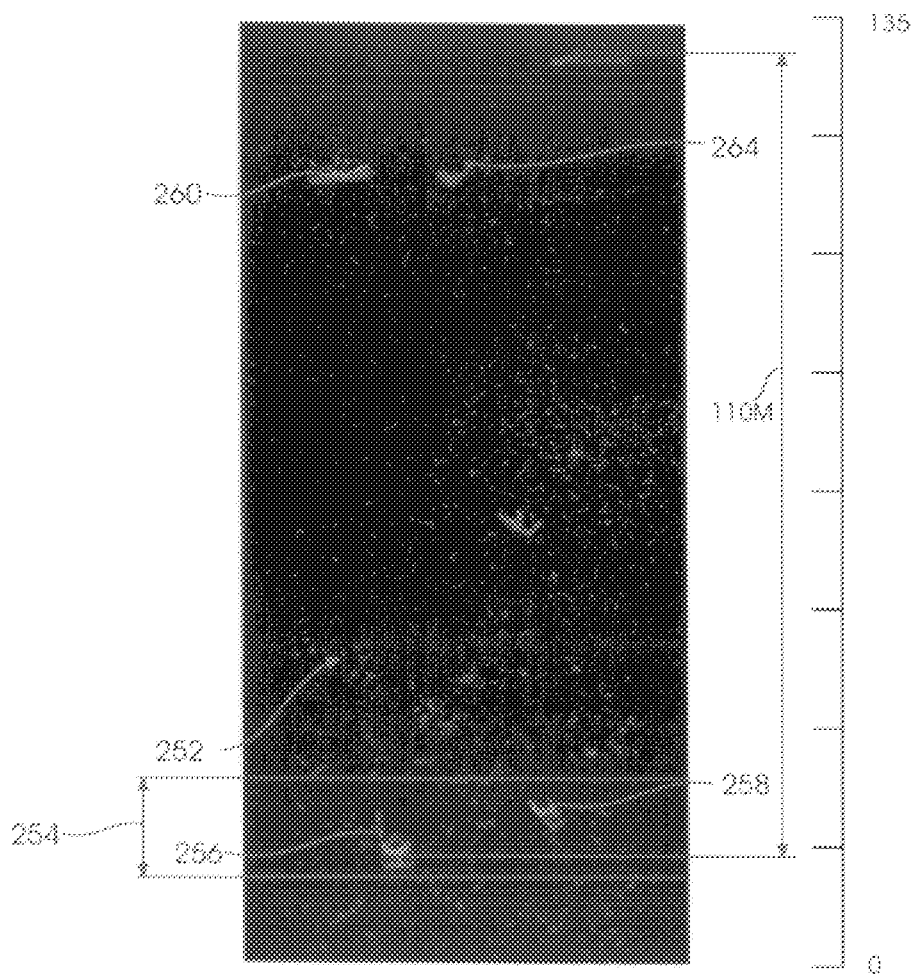
FIG. 10B illustrates a height image that corresponds to the fused image of FIG. 10A.

Scanner-induced anomalies are produced if an intensity correction is made without accounting for scanner dependent backscatter intensity fluctuations. These anomalies may appear at different locations in the image, and they may introduce varying degrees of inaccuracy into the intensity image. One example of a scanner-induced anomaly 251 is illustrated in a corrected intensity image 260 illustrated in FIG. 11. As can be seen in FIG. 10, the anomaly does not appear in the uncorrected intensity image 250.

While the following technique may be performed at the time every intensity image is formed, it is advantageous to form a single scanner dependent correction array that can later be applied when forming intensity images. To form a scanner dependent correction array, the manufacturer or user, for instance, advantageously aims the LADAR system 10 at a fixed target field, such as the sky or a single color object like a painted wall. Then, a number of laser beam pulses 34 are transmitted into the fixed target field to form a number L of arrays that are averaged to form a scanner dependent correction array SDC.

The flowchart 150 describes a method for correcting for scanner-induced anomalies. In block 151, the variable array $SUM_{I,J}$, which represents the array sum of L backscatter intensity arrays, is set to zero. In blocks 152, 154, and 156, the variables K, I, and J are set to zero. In block 158, the backscatter intensity signal B for the pixel in row I, column J, is sampled by the signal processing unit 18. The backscatter intensity signal B for the pixel in row I, column J, is added to the sum of the backscatter intensities for the pixel in row I, column J. In block 162, the column J is incremented by 1, and, in block 164, the column J is compared to the number M of columns in the scan. Until each column J has been read from a particular row I, control transfers back to block 158, and the steps described in blocks 158, 160, 162, and 164 are repeated.

Once the backscatter intensity signal B for each pixel of each column J of a particular row I has been processed, the row I is incremented by 1, as set forth in block 166. In block 168, the row I is compared to the number N of rows in the scan. Until each row I has been scanned, control transfers back to block 156 where the column J is reset to zero, so that the steps described in blocks 158, 160, 162, 164, 166, and 168 may be repeated.

Since a single backscatter intensity array is contaminated by both time-invariant scanner effects and time-variant laser power fluctuations, this process is repeated a number of times L to average out the time-variant laser power fluctuations. Therefore, once each row I and each column J has been scanned, the scan variable K is incremented in block 170. In block 172, the scan variable K is compared to the number of scans L to be averaged. Until the scan variable K equals the number of scans L to be averaged, control transfers back to block 154, and the steps of blocks 154–172 are repeated. Because different LADAR systems have different lasers and optical systems, the number of scans L is best determined by testing each type of LADAR system.

Once the number of scans L has been added in array fashion, the row I and the column J are reset to zero in blocks 174 and 176, respectively. In block 178, the average scanner dependent correction array SDC is determined by dividing the array sum of L backscatter intensity arrays by the number of scans L. In block 180, the minimum scanner dependent correction $SDC_{min}$ is determined by selecting the smallest scanner dependent correction factor from previous $SDC_{min}$ signals and the SDC just defined in block 178. Next, in block 182, the column J is incremented by 1, and, in block 184, the column J is compared to the number of columns M in the scan. Until the column J equals the number of columns M in the scan, the steps set forth in blocks 178–184 are repeated. Once each column J of a particular row I has been scanned, the row I is incremented by 1 in block 186, and, in block 188, it is compared to the number of rows N in the scan. Until each column J of each row I in the scan has been processed, the steps of blocks 176–188 are repeated.

Upon completion of this process, the values of $SDC_{I,J}$ and $SDC_{MIN}$ are stored for later use by the intensity correction method described with reference to FIGS. 9a and 9b. The flowchart 189, depicted in FIGS. 9a and 9b, describes a method for correcting the intensity of pixels used to generate an intensity image. This correction is performed due to the fluctuation in the magnitudes of the transmitted laser beam pulses 34 used to illuminate the target field. Such fluctuation is represented in FIG. 7 by the two pulses 140a and 140b. As can be appreciated, an object reflects a transmitted laser beam pulse 34 having a given magnitude to produce a return pulse 68 having some given magnitude. Thus, an object that reflects a transmitted laser beam pulse 34, which corresponds to the pulse 140*a,* may deliver a return pulse 69*a.* The same object may reflect a laser beam pulse 34 having a lower magnitude, which corresponds to the pulse 140*b,* and deliver a return pulse 69*b* having a relatively lower magnitude.

Referring to the flowchart 189, in blocks 190 and 192, the row I and the column J are set to zero. In block 194, the backscatter intensity signal B and the return intensity signal S for each pixel in row I, column J, is sampled by the signal processing unit 18. The backscatter intensity signal B is corrected for scanner-dependent anomalies, as shown in the block 196. Then, in block 198, the column J is incremented by 1, and, in block 200, the column J is compared to the number of columns M in the scan. Until each column J of a particular row I is processed, the steps 194–200 are repeated.

Once the pixels in each column J of a row I are processed according to the steps set forth in blocks 194–200, the row I is incremented by 1 in block 202. In block 204, the row I is compared to the number of rows N in the scan. Until each pixel in each column J in each row I in the scan is processed, the steps 192–204 are repeated.

Once the backscatter intensity signal B for each pixel of each row I and column J in the scan has been corrected to reduce or eliminate scanner-dependent anomalies, the backscatter sum variable $B_{SUM}$, the row variable I, and the column variable J are reset to zero in blocks 205, 206 and 208, respectively. In blocks 210, 212, 214, 216, and 218, the value of each backscatter intensity signal B for each pixel in each row I and column J in the scan is summed together. Then, in block 220, the average backscatter intensity signal $B_{AVG}$ for the scan is determined by dividing $B_{SUM}$ by the total number of pixels in the scan. Alternatively, the average backscatter intensity signal $B_{AVG}$ for the scan may be set to the median value of all backscatter intensity signals.

Once the average backscatter intensity signal $B_{AVG}$ is determined, the row I and column J are reset to zero in blocks 222 and 224, respectively. In block 226, the intensity correction factor $C_{I,J}$ for each backscatter intensity signal $B_{I,J}$ is calculated as shown in blocks 226–234. Basically, the intensity correction factor $C_{I,J}$ is calculated by dividing the backscatter intensity signal $B_{I,J}$ for each pixel by the average backscatter intensity signal $B_{AVG}$.

Once the intensity correction factor $C_{I,J}$ for each backscatter intensity signal $B_{I,J}$ is determined, the row I and column J are set to zero in blocks 236 and 238, respectively. Then, the corrected signal intensity signal $S'_{I,J}$ for each pixel for each row I and column J is calculated in blocks 238–248. Essentially, the received signal intensity signal $S_{I,J}$ is divided by the intensity correction factor $C_{I,J}$ for each pixel. Once the corrected signal intensity signal $S'_{I,J}$ is calculated for each pixel, the corrected intensity image may be displayed.

It should be understood that the range and intensity images may be formed in a variety of different ways. The manner of forming the intensity image described above is advantageous because it provides a sharper intensity image that is easier for a human to interpret. In any event, once the LADAR system 10 forms the range and intensity images the images may be combined, or "fused," so that a human can gain the benefit of the data in a range image and an intensity image by merely referring to the fused image. Although this fused image may be easier for a human to interpret than the separate images, it has been found that interpretation of a fused image is facilitated by illuminating only one colored range band in the fused image. In other words, a single color band, containing five colors for instance, may be illuminated and moved throughout the fused image.

This type of fused image, along with the advantages of such a fused image, can best be understood by referring to FIGS. 10–13, where specific exemplary images are depicted. FIG. 10A illustrates a fused image 250 of a first field. To form the image 250, the LADAR system 10 is positioned perpendicularly to the plane of the page. FIG. 10B depicts a height image 252 that corresponds to the fused image 250. As shown by the length of the height image 252, the depth of the field of the fused image 250 is approximately 120 meters. A color band 254 is illustrated on the height image 252 for purposes of clarity. The color band 254 is approximately 10 meters in width and is positioned to illuminate objects located at 10 to 20 meters into the field.

As shown in the fused image 250, the color band 254 illuminates an M1 tank 256 and an HMMWV ("pronounced HUM V") 258. The two vehicles 256 and 258 are also discernible on the height image 252. The height image 252 also depicts additional vehicles 260, 262, and 264 that are approximately 100 to 110 meters from the illuminated vehicles 256 and 258. The vehicles 256–264 would be difficult to identify by viewing a range image, an intensity image, or a completely fused image. However, by viewing the partially fused image 250, and by moving the color band 254 throughout the entire depth of the partially fused image 250, all vehicles 256–264 are easily discernible.

Although it is often desirable to identify objects as large as vehicles in a scanned field, it would also be quite useful to identify smaller objects in the scanned field. A partially fused image through which a human can scroll a color band is particularly useful in identifying such small objects. This utility is demonstrated and illustrated by reference to FIGS. 11–13.

Figure 11A:
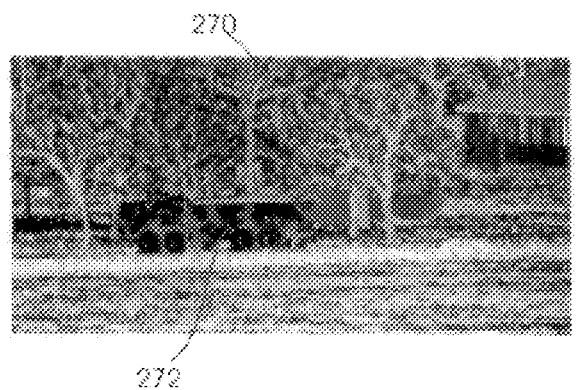
FIG. 11A illustrates a fused range and intensity image of the second field.
Figure 11B:
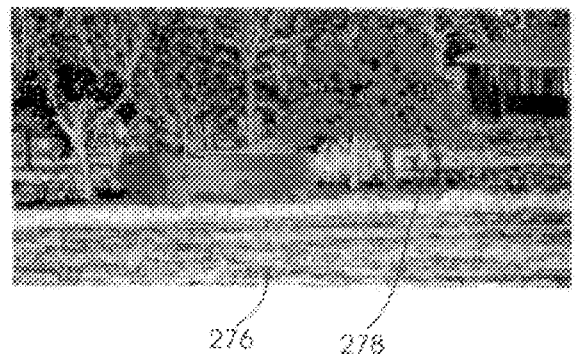
FIG. 11B illustrates a second fused image of the second field.
Figure 11C:
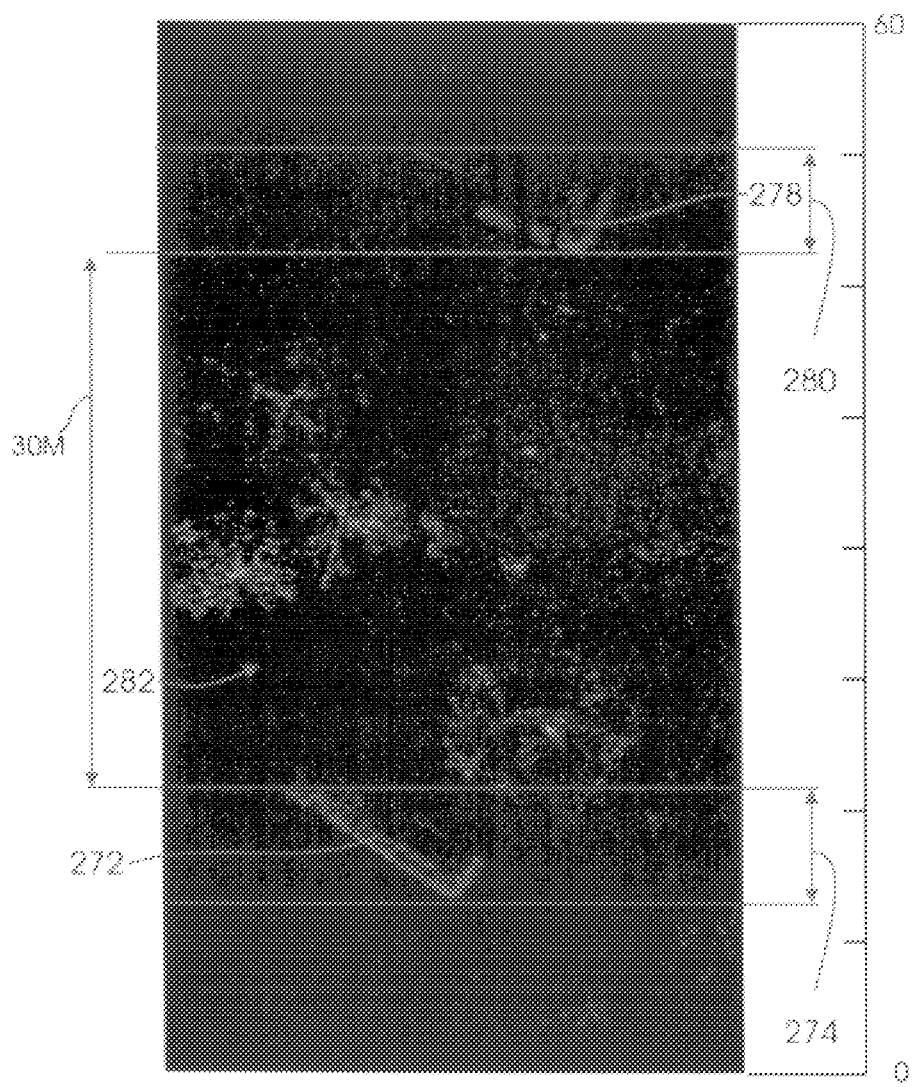
FIG. 11C illustrates a height image of the second field that corresponds to the fused images of FIGS. 11A and 11B.

FIG. 11A illustrates a fused image 270 in which a vehicle 272 is illuminated by a range band 274. FIG. 11B illustrates another fused image 276 of the same field in which an M1 tank 278 is illuminated by a range band 280. FIG. 11C illustrates a height image 282 that corresponds to the fused images 270 and 276. As can be seen, the depth of the field of the fused images 270 and 276 is approximately 60 meters. Each range band 274 and 280 is approximately 10 meters in width. The range bands 274 and 280 are separated from one another by approximately 30 meters. It should be understood that the range bands 274 and 280 are designated by different reference numerals for purposes of clarity. In actuality, a single range band is scrolled throughout the fused image to illuminate objects within that range band.

Figure 12A:
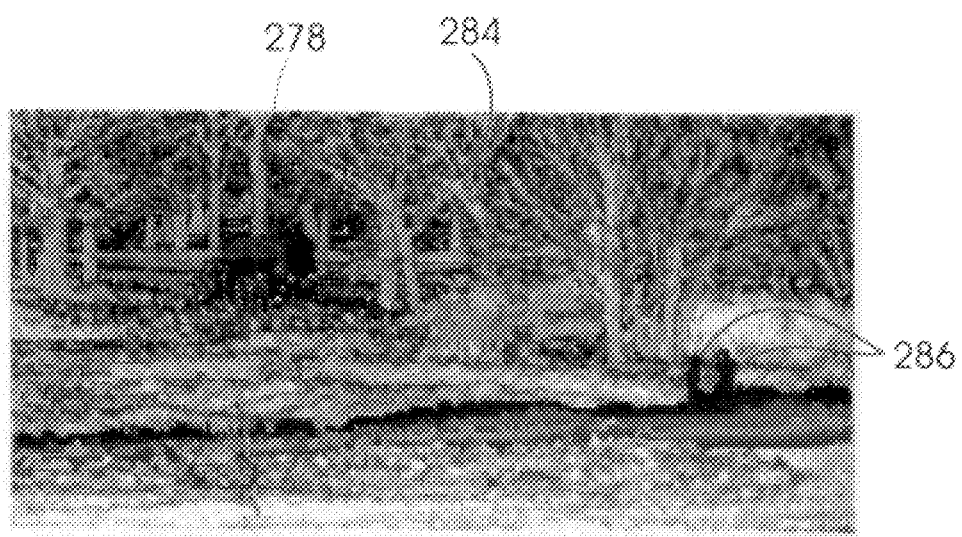
FIG. 12A illustrates a third fused image of the second field.
Figure 12B:
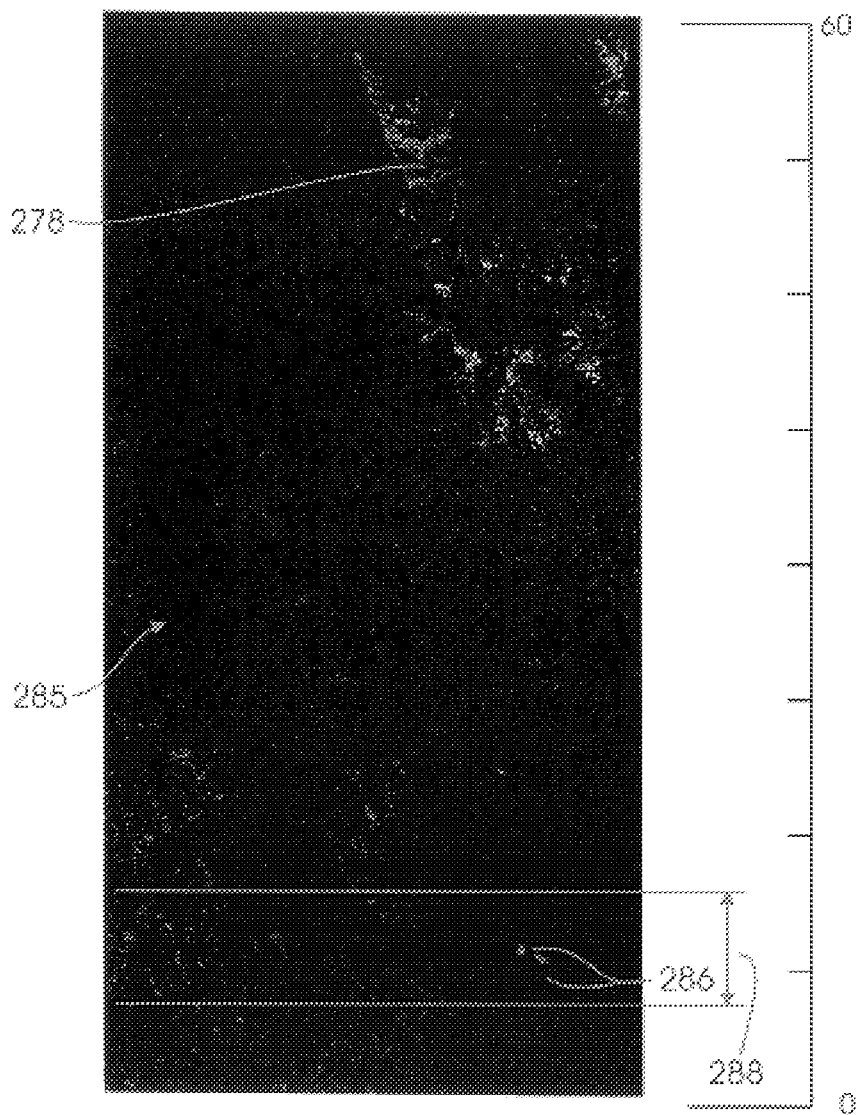
FIG. 12B illustrates a height image of the second field that corresponds to the fused image of FIG. 12A.

By viewing the fused images 270 and 276, it is easy to identify the vehicles 272 and 278 when they are illuminated, but it is also possible to identify them in the intensity image. However, in another image 284, illustrated in FIG. 12A, people are standing in the scanned field, and these people are much more difficult to identify by merely viewing the intensity information. However, if the color band 288 illustrated in the top-down image 285 of FIG. 12B is scrolled several meters in front of the tank 287, the people become illuminated and, thus, their presence may be ascertained. As can be seen, the fused image 284 of FIG. 12A includes the silhouettes of two people 286 that are illuminated by the range color band 288.

Figure 13A:
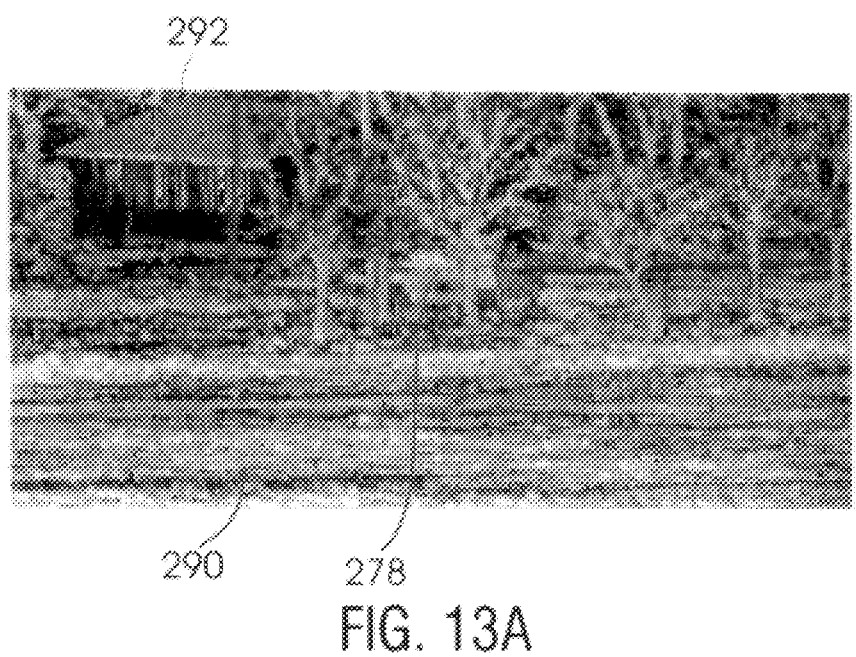
FIG. 13A illustrates a fourth fused image of the second field.
Figure 13B:
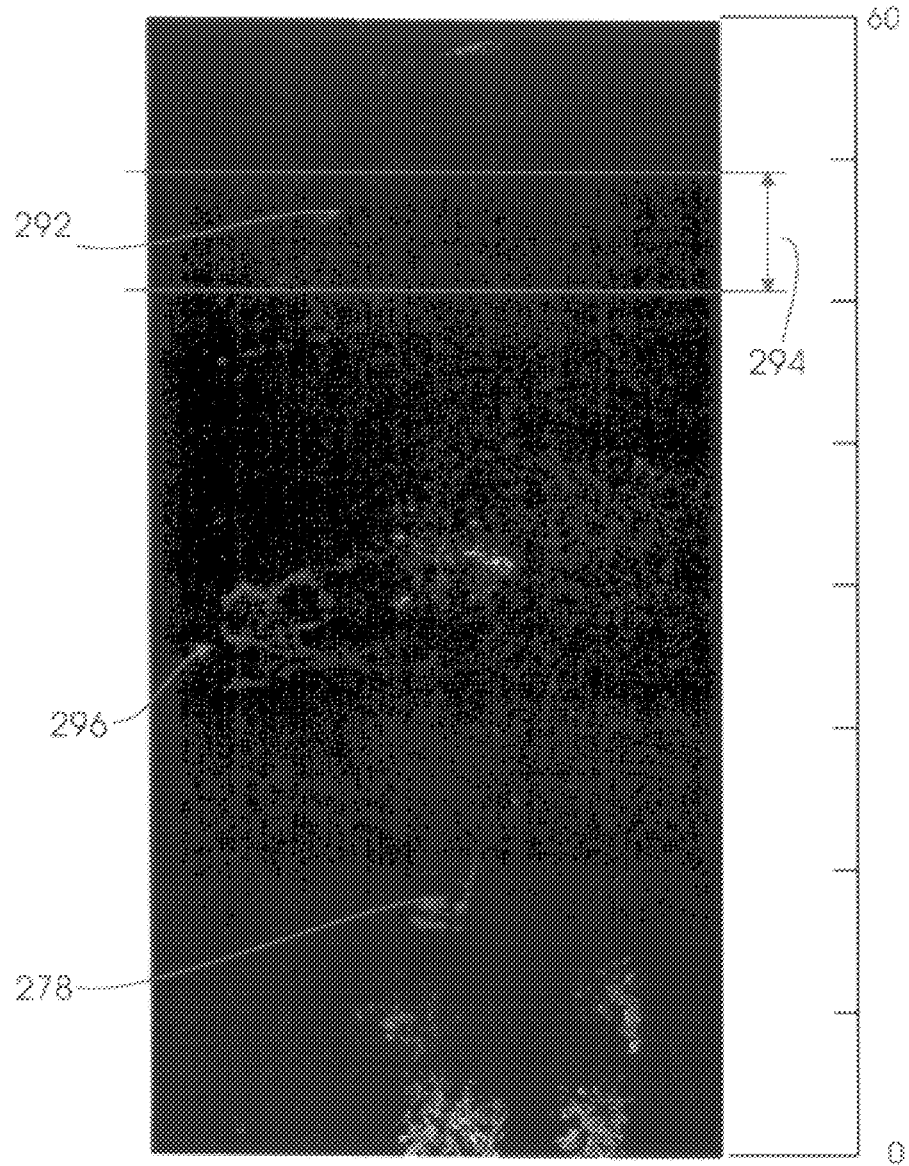
FIG. 13B illustrates a height image that corresponds to the fused image of FIG. 13A.

Of course, people are not the only relatively small objects that a partially fused image can detect. For instance, FIG. 13A illustrates a fused image 290 in which a telephone pole 292 is illuminated by the colored range band 294. As can be seen from FIG. 13B, the colored range band 294 is located approximately 30 meters behind the M1 tank 291 in the height image 296.

The manner in which the LADAR system 10 defines and scrolls a colored band in a partially fused image can best be understood by referring to the following definitions and equations:

| | |
|---|---|
| I = | row variable equal to between 1 and N where N is the number of rows in the image |
| J = | column variable equal to between 1 and M where M is the number of columns in the image |
| $I_{I,J}$ = | LADAR intensity (or other pixel registered data) for pixel I,J |
| $R_{I,J}$ = | LADAR range (or other pixel registered data) for pixel I,J |
| rng = | center of current range band |
| width = | width of current range band |
| low = | rng − width/2 |
| high = | rng + width/2 |
| $F_{I,J}$ = | fused LADAR intensity/range image for pixel I,J |
| = | $R_{I,J}$ if low < $R_{I,J}$ < high |
| | $I_{I,J}$ otherwise |

OTHER DISPLAY FORMAT VARIATIONS

| | |
|---|---|
| $IB_{I,J}$ = | LADAR intensity, range band image for pixel I,J |
| = | $I_{I,J}$ if low < $R_{I,J}$ < high |
| | 0 otherwise |
| $RB_{I,J}$ = | LADAR range, range band image for pixel I,J |
| = | $R_{I,J}$ if low < $R_{I,J}$ < high |
| | 0 otherwise |

Figure 14:
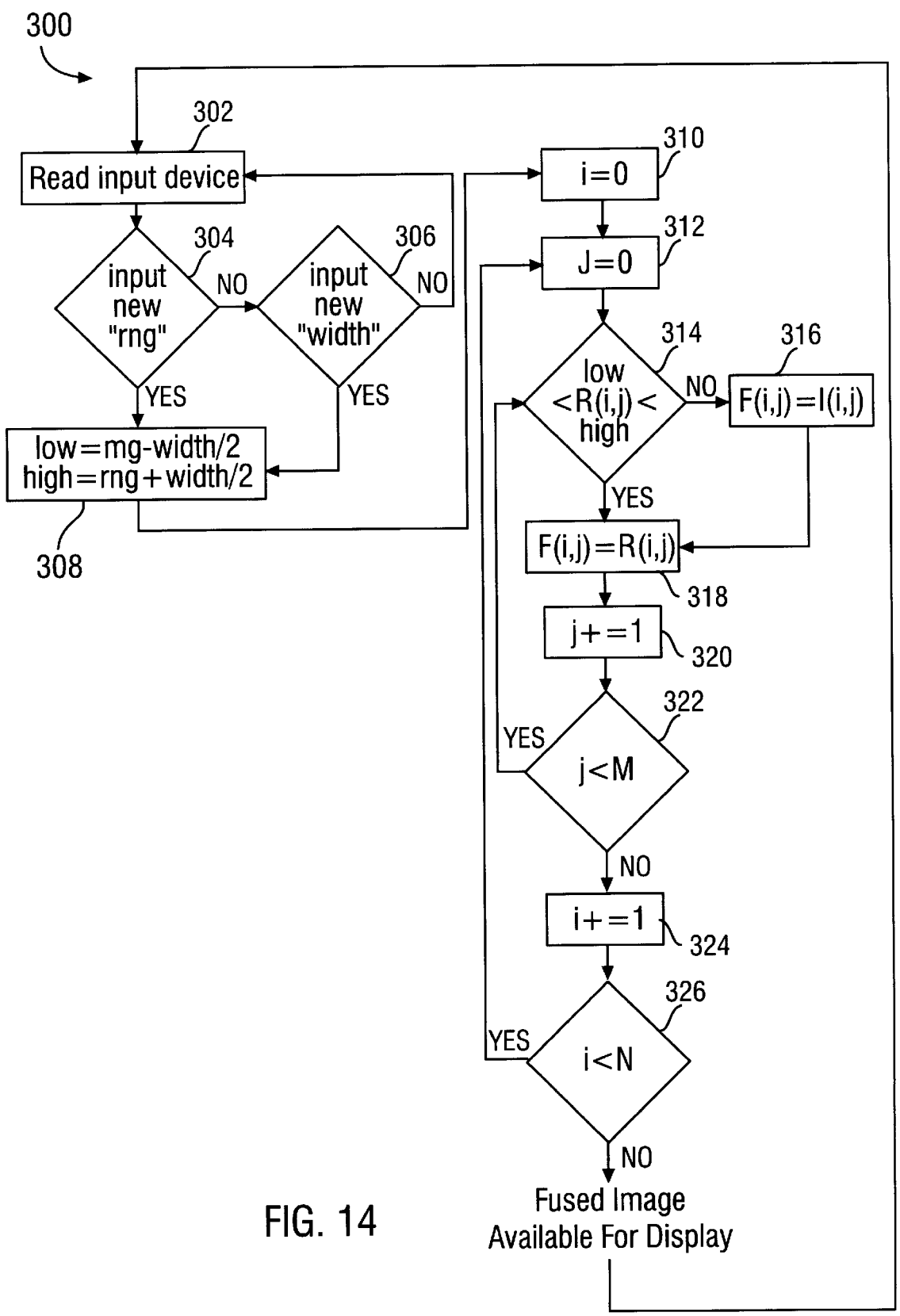
FIG. 14 illustrates a flowchart depicting the generation of a fused intensity and range image.

Using these variables and equations, the signal processing unit 18 executes the following method, depicted by the flowchart 300 in FIG. 14, to create a color band and to permit it to be scrolled throughout the fused image. In block 302, the fused image is input. In block 304, the signal processing unit 18 determines whether the center of the current range band has been changed by the operator of the LADAR system 10. If it has not, the signal processing unit 18 determines whether the operator has input a new width for a range band, in blocks 306. If not, the steps set forth in blocks 302, 304, and 306 are repeated.

Once the operator chooses to move the range band or to change the width of the range band, a new center and width of the range band are calculated in block 308. Then, the row variable I and the column variable J are set to zero in blocks 310 and 312, respectively. Next, in block 314, the low and high bounds of the range band are compared to the current range signal R for a pixel in row I, column J. If the range signal R does not fall within these bounds, the fused intensity/range signal F for the pixel in row I, column J, is equated to the intensity signal I,J for that pixel in block 316.

Ultimately, in block 318, the fused intensity/range image for the pixel in row I, column J, is equated to the LADAR range signal R for that pixel in block 318. As illustrated in blocks 320, 322, 324, and 326, the steps 314, 316, and 318 are repeated until the fused image for each pixel in the image has been determined. Once each pixel has been checked, the fused image is then available for display.

What is claimed is:

1. A method of generating target information, the method comprising the steps of:

(a) generating a three-dimensional image;

(b) generating a two-dimensional image;

(c) combining the three-dimensional image and the two-dimensional image to generate a fused image; and (d) scrolling the three-dimensional image through the two-dimensional image.

2. A method of generating target information, the method comprising the steps of:

(a) generating a three-dimensional image;

(b) generating a two-dimensional image;

(c) combining the three-dimensional image and the two-dimensional image to generate a fused image; and (e) scrolling the three-dimensional image through the two-dimensional image, wherein the three-dimensional image is displayed as a color band in the fused image.

3. In a LADAR system adapted to generate a three-dimensional range image and a two-dimensional intensity image, the improvement comprising:

means for combining the three-dimensional range image and the two-dimensional intensity image into a fused image; and means for scrolling the three-dimensional range image through the two-dimensional intensity image.

4. A method of generating target information, the method comprising the steps of:

(a) generating a three-dimensional range image;

(b) generating a two-dimensional intensity image;

(c) combining the three-dimensional range image and the two-dimensional intensity image to generate a fused image; and (d) scrolling the three-dimensional range image through the two-dimensional intensity image.

5. A method of generating target information, the method comprising the steps of:

(a) generating a three-dimensional range image;

(b) generating a two-dimensional intensity image;

(c) combining the three-dimensional range image and the two-dimensional intensity image to generate a fused image; and (d) scrolling the three-dimensional range image through the two-dimensional intensity image;

wherein the three-dimensional range image is displayed as a color band when the three-dimensional range image is scrolled through the two-dimensional intensity image, and wherein the three-dimensional range image displayed at a given time as the color band in the fused image corresponds to an interval of ranges, and colors in the color band indicate respective ranges within the interval of ranges.

6. An apparatus for generating target information, the apparatus comprising:

means for generating a three-dimensional range image;

means for generating a two-dimensional intensity image;

means for combining the three-dimensional range image and the two-dimensional intensity image to generate a fused image; and means for scrolling the three-dimensional range image through the two-dimensional intensity image.

7. A method of generating target information, the method comprising the steps of:

(a) generating a range image wherein each pixel has an x, y, and z value;

(b) generating an intensity image;

(c) combining the range image wherein each pixel has an x, y, and z value with the intensity image to generate a fused image; and (d) scrolling the range image through the intensity image.

8. A method of generating target information, the method comprising the steps of:
- (a) generating a range image wherein each pixel has an x, y, and z value;
- (b) generating a two-dimensional intensity image;
- (c) combining the range image wherein each pixel has an x, y, and z value with the two-dimensional intensity image to generate a fused image;
- (d) scrolling the range image through the two-dimensional intensity image; and
- (e) displaying the range image as a color band when the range image is scrolled through the two-dimensional intensity image wherein the range image displayed at a given time as the color band in the fused image corresponds to an interval of ranges, and colors in the color band indicate respective ranges within the interval of ranges.

9. An apparatus for generating target information, the apparatus comprising:
- means for generating an image wherein each pixel has an x, y, and z value;
- means for generating a two-dimensional intensity image;
- means for combining the image wherein each pixel has an x, y, and z value with the two-dimensional intensity image to generate a fused image; and
- means for scrolling the image wherein each pixel has an x, y, and z value through the two-dimensional intensity image.

10. A method for collecting and displaying target information comprising the steps of:
- scanning a target field;
- collecting range data and reflectivity data for each location in the target field;
- generating a three-dimensional image from the range data;
- generating a two-dimensional image from the reflectivity data;
- combining the three-dimensional image and the two-dimensional image to form a fused image of the target field; and
- scrolling the three-dimensional image through the two-dimensional image.

11. A method for collecting and displaying target information comprising the steps of:
- scanning a target field;
- collecting range data and reflectivity data for each location in the target field;
- generating a three-dimensional image from the range data;
- generating a two-dimensional image from the reflectivity data;
- combining the three-dimensional image and the two-dimensional image to form a fused image of the target field;
- scrolling the three-dimensional image through the two-dimensional image; and
- displaying the three-dimensional image as a color band when the three-dimensional image is scrolled through the two-dimensional image and wherein the three-dimensional image displayed at a given time as the color band in the fused image corresponds to an interval of ranges, and colors in the color band indicate respective ranges within the interval of ranges.

* * * * *

UNITED STATES PATENT AND TRADEMARK OFFICE
CERTIFICATE OF CORRECTION

PATENT NO. : 5,852,492
DATED : December 22, 1998
INVENTOR(S) : Nimblett, et al.

It is certified that error appears in the above-identified patent and that said Letters Patent is hereby corrected as shown below:

On the title page, item [54] and column 1, line 3, "LASAR" should read --LADAR--.

Signed and Sealed this

Thirteenth Day of April, 1999

Attest:

Q. TODD DICKINSON

Attesting Officer

Acting Commissioner of Patents and Trademarks